United States Patent
Steinert

[11] Patent Number: 6,126,177
[45] Date of Patent: Oct. 3, 2000

[54] SENSOR ARRANGEMENT ON A WHEEL SUSPENSION FOR A VEHICLE

[75] Inventor: Hans-Rudolf Steinert, Bitz, Germany

[73] Assignee: DaimlerChrysler AG, Stuttgart, Germany

[21] Appl. No.: 09/349,099

[22] Filed: Jul. 8, 1999

[30] Foreign Application Priority Data

Jul. 11, 1998 [DE] Germany .......................... 198 31 248

[51] Int. Cl.⁷ ................................................. B60G 17/01
[52] U.S. Cl. ...................................... 280/5.5; 280/DIG. 1
[58] Field of Search ................................ 280/5.5, 5.506, 280/5.507, 5.508, 5.509, 5.513, 5.514, DIG. 1

[56] References Cited

U.S. PATENT DOCUMENTS

| | | | |
|---|---|---|---|
| 2,987,312 | 6/1961 | Alliquant | 280/DIG. 1 |
| 3,199,928 | 8/1965 | Chouings | 280/DIG. 1 |
| 4,553,773 | 11/1985 | Pierce | 280/DIG. 1 |
| 4,614,247 | 9/1986 | Sullivan | 280/DIG. 1 |
| 4,756,374 | 7/1988 | Bailey et al. | 177/137 |
| 4,838,563 | 6/1989 | Konishi et al. | 280/840 |
| 4,982,972 | 1/1991 | Preston et al. | 280/DIG. 1 |
| 5,032,821 | 7/1991 | Domanico et al. | 340/440 |
| 5,033,762 | 7/1991 | Rakowski | 280/DIG. 1 |

FOREIGN PATENT DOCUMENTS

| | | |
|---|---|---|
| 0 094 857 A1 | of 1983 | European Pat. Off. . |
| 0 632 253 A1 | of 1994 | European Pat. Off. . |
| 06 282368 | of 1994 | European Pat. Off. . |
| 07 287835 | of 1995 | European Pat. Off. . |
| 39 19 040 A1 | of 1990 | Germany . |
| 44 29 856 C1 | of 1995 | Germany . |
| 2 028 513 | of 1979 | United Kingdom . |

*Primary Examiner*—Kenneth R. Rice
*Attorney, Agent, or Firm*—Evenson, McKeown, Edwards & Lenahan, P.L.L.C.

[57] ABSTRACT

In a sensor arrangement for a vehicle wheel suspension, a pivot arm is mounted pivotably on a vehicle body and a sensor for detecting the relative position between pivot arm and vehicle body is arranged in a fixed position on the vehicle body. The sensor is mechanically coupled to the pivot arm. A sensor-side attachment element and a pivot-arm-side attachment element are attached to the vehicle body at a common attachment point.

11 Claims, 3 Drawing Sheets

SENSOR ARRANGEMENT ON A WHEEL SUSPENSION FOR A VEHICLE

BACKGROUND AND SUMMARY OF THE INVENTION

This application claims the priority of 198 31 248.2, filed Jul. 11, 1998, the disclosure of which is expressly incorporated by reference herein.

The invention relates to a sensor arrangement on a wheel suspension for a vehicle.

In vehicles, in particular in motor vehicles, such as passenger cars, trucks and buses, many vehicle-side control devices may require information concerning the relative position of a vehicle body and a pivot arm which is mounted pivotably thereon in a wheel suspension. For example, the electronic control unit of a level-control device uses the relative position between a transverse link which is coupled to a wheel and the vehicle body for each axle (or for each wheel), to determine the control input which is required in order to set a predetermined vehicle level. To ascertain this relative position, a sensor is used, which usually detects the deviation of the pivot arm from a starting position.

For example, in a sensor arrangement disclosed in German Patent Document DE 39 19 040 A1, a pivot arm is mounted pivotably on a vehicle body, and a sensor for detecting the relative position between pivot arm and vehicle body is arranged in a fixed position on the vehicle body. In order to detect the relative position between pivot arm and vehicle body, the sensor is mechanically coupled to the pivot arm.

German Patent Document DE 44 29 856 C1 discloses a sensor arrangement in which an axis of rotation of the sensor is arranged coaxially with a pivot axis of the pivot arm, about which the pivot arm of the wheel suspension is mounted pivotably on the vehicle body when the wheel suspension springs inwards and outwards.

During the assembly of a vehicle, the individual components of a wheel assembly are put together and mounted. Owing to the large number of individual parts which are put together, the manufacturing tolerances of these parts may accumulate to such an extent that it is necessary to compensate for the tolerances for the sensor in order to define a starting relative position between the pivot arm of the wheel suspension and the vehicle body. Various procedures are available for carrying out such tolerance compensation. In the case of sensors which are equipped with a longitudinally adjustable control rod, the tolerance compensation may be carried out mechanically by suitably adjusting the length of this control rod. However, to allow such tolerance compensation to be carried out, there must be sufficient space at the location where the sensor is fitted for the control rod to be adjusted manually; however, this cannot be ensured for every type of vehicle.

In the case of other sensors, the tolerance compensation may be carried out electronically, in which case the electronics in question can theoretically define any desired sensor position as the reference position. However, in the case of sensors whose structure allows only a limited measurement range in the form of deviations from a starting position to be determined, an actual installation position which in fact differs from a defined desired installation position in practice reduces the measurement range or, if the sensor electronics allow such calibration, results in a reduced measurement accuracy.

Finally, it is possible—at least in theory—for the sensor to be fitted to the finished vehicle only as virtually the last component, in order for the sensor then to be adjusted with the desired alignment while it is being installed. However, the installation conditions often do not allow this, or allow this only with a disproportionately high level of effort.

One object of the present invention is to provide a sensor arrangement of the type mentioned at the outset, with an improved tolerance compensation.

This and other objects and advantages are achieved by the sensor arrangement according to the invention, which is based on the general idea of using a common attachment point on the vehicle body for the pivot arm and the sensor. The result of this measure is that an essential relative measurement between sensor and pivot shaft is then dependent only on the manufacturing tolerances of the pivot-arm-side and sensor-side attachment elements rather than on the total tolerances of the numerous individual components which have been fitted to the wheel suspension, as with conventional sensor arrangements.

If the pivot-arm-side attachment element and the sensor-side-attachment element are then both designed to meet relatively tight tolerances, there is no need to carry out a tolerance compensation with regard to this relative arrangement between sensor and pivot arm. By way of example, a bearing of the pivot arm (pivot-arm-side attachment element) and a housing part of the sensor (sensor-side attachment element) are together attached to the vehicle body by means of a screw. The distance between the sensor and the common attachment point of the pivot arm is then independent of the actual arrangement of the attachment point on the vehicle body (which is dependent on the manufacturing and assembly tolerances of the individual parts which interact on the wheel suspension). In order to obtain the optimum alignment of the sensor relative to the pivot arm, all that then remains is to set an angle which is included between a first straight line, which runs through the attachment point and the sensor, and a second straight line, which runs through the attachment point and the point where the sensor is coupled to the pivot arm.

Thus, in the sensor arrangement according to the invention, there is no need for a tolerance compensation for the relative position of the sensor at least with regard to the distance between the sensor and the attachment point of the pivot arm. However, given a fixed distance, the required spatial arrangement of sensor in relation to pivot arm can be set relatively easily and relatively accurately. A tolerance compensation in this respect may preferably be carried out electronically, without this process significantly impairing the measurement range of the sensor or its measurement accuracy.

In a particularly advantageous embodiment of the sensor arrangement according to the invention, the sensor-side attachment element may be a sensor holder which is designed as a separate component and to which the sensor is attached. A component of this nature can be manufactured relatively inexpensively and with a high level of accuracy, for example as a stamped part, so that sensors which have been used hitherto can continue to be used without alteration. In this case, the sensor holder has first attachment means for securing the sensor to the sensor holder, and second attachment means for securing the sensor holder to the vehicle body together with the pivot-arm-side attachment element. A tolerance which is as tight as desired can then be observed for the relative position of the first and second attachment means on the sensor holder.

According to another embodiment of the sensor arrangement according to the invention, the common attachment point of sensor-side attachment element and pivot-arm-side attachment element may be formed by a bearing bolt which forms the pivot pin of the pivot arm. Moreover, in this case, the pivot-arm-side attachment element may be pivotably attached to the vehicle body by means of the bearing bolt, in which case the sensor-side attachment element has a hole, in particular a hole for the bearing bolt to fit into. This measure enables the sensor-side and pivot-arm-side attachment elements to be automatically mounted on the vehicle body, the bearing bolt attaching not only the pivot-arm-side attachment element but also the sensor-side attachment element, which has been guided or pushed onto the pivot-arm-side attachment element, to the vehicle body.

According to a further embodiment of the sensor arrangement according to the invention, it is possible to provide positioning means which are used to automatically locate a predetermined relative position of the sensor-side attachment element in relation to the vehicle body. Such positioning can be carried out mechanically in particular. Stipulation of this relative position also makes the relative position of the sensor with respect to the pivot arm dependent on the manufacturing and assembly tolerances of the individual components of the wheel suspension. However, this dependency, compared to the novel predetermined relative position between the sensor and its common attachment or articulation point with the pivot arm on the vehicle body, has considerably less influence on the adjustment of the starting relative position between pivot arm and vehicle body, so that only a slight tolerance compensation is required. This can be carried out electronically without noticeably impairing the measurement range and/or the measurement accuracy of the sensor.

It will be understood that the features mentioned above and those which are still to be explained below can be used not only in the combination given in each case but also in other combinations or as a stand-alone measure without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
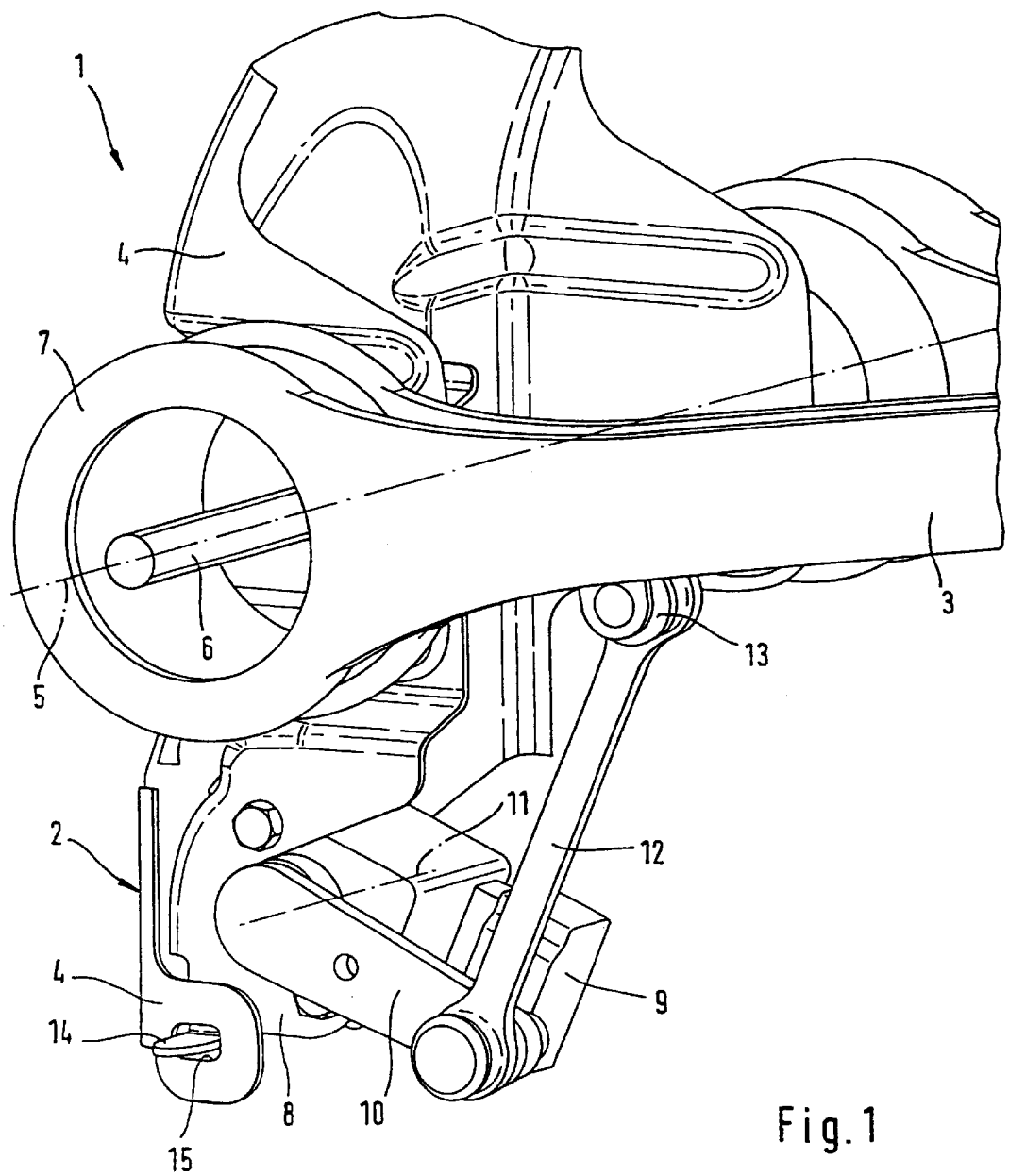
FIG. 1 shows a perspective front view of a sensor arrangement on a wheel suspension, only part of which is illustrated.
Figure 2:
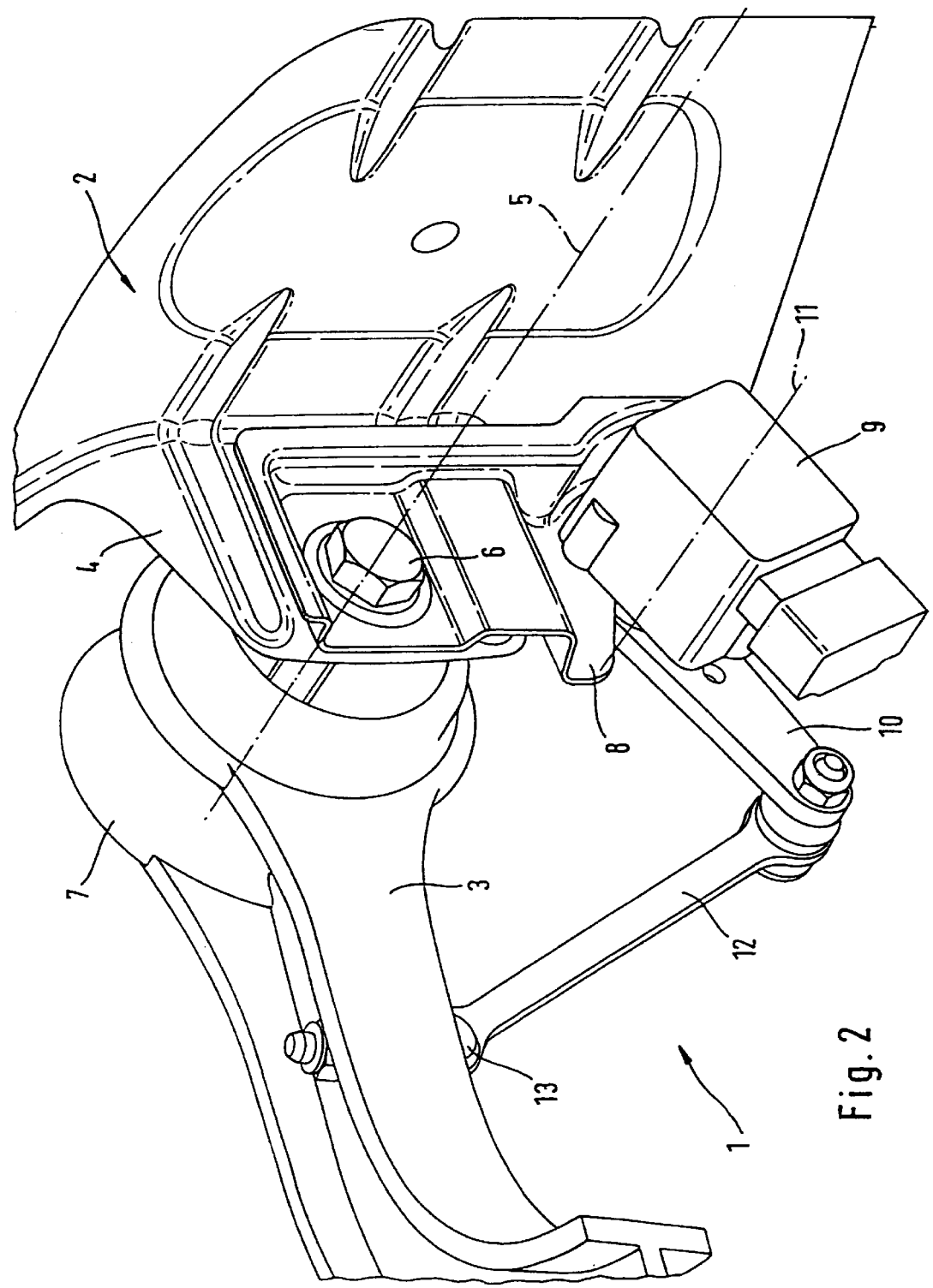
FIG. 2 shows a perspective rear view of the sensor arrangement from FIG. 1.

In accordance with FIGS. 1 and 2, the sensor arrangement according to the invention is provided on a wheel suspension 1, which supports a wheel (not shown) of a vehicle (not otherwise shown) on the vehicle body 2. FIGS. 1 and 2 show the area where a transverse link 3 (a pivot arm) of the wheel suspension 1 bears on the vehicle body 2. The transverse link 3 is mounted on a bearing bracket 4 formed on the vehicle body 2, and is pivotable about a pivot axis 5.

The pivotable attachment of the transverse link 3 to the vehicle body 2 or to its bearing bracket 4 is achieved with the aid of a bearing bolt 6 in the form of a securing screw, which penetrates through the bearing bracket 4 and is screwed to a pivot bearing (not shown) of the transverse link 3. The abovementioned pivot bearing is arranged in an eyelet 7 of the transverse link 3 and is not shown for the sake of clarity.

The bearing bolt 6 penetrates through the bearing bracket 4 in an opening (not shown in FIGS. 1 and 2) which is provided for this purpose and fixes the relative position of the pivot axis 5 in relation to the vehicle body 2. In order to compensate for the manufacturing and assembly tolerances of the individual components, which accumulate during construction of the wheel suspension, the abovementioned opening for the bearing bolt 6 is fitted to the vehicle body 2 after it has otherwise been largely finished. In this way, the opening in the bearing bracket 4 for the bearing bolt 6 is positioned as a function of the relative position between pivot axis 5 and vehicle body 2, which position is established individually for each different assembly situation and is required for the wheel suspension 1 to function optimally.

A sensor holder 8 is attached to the vehicle body 2 at the same time as the pivot bearing (not shown) of the transverse link 3, with the aid of the bearing bolt 6. In the embodiment illustrated, the sensor holder 8 is clamped between the head of the bearing bolt 6 and the bearing bracket 4 in the manner of a washer, on that side of the bearing bracket 4 which is opposite from the pivot bearing of the transverse link 3. (See FIG. 2.) The bearing bolt 6 and/or the opening provided for this bolt in the bearing bracket 4 thus form a common attachment point for the transverse link 3 and the sensor holder 8 on the vehicle body 2.

As shown in FIGS. 1 and 2, a sensor 9 is attached to the sensor holder 8 approximately vertically below the point (bearing bolt 6) where the sensor holder 8 is attached to the vehicle body 2. The sensor 9 has a pivot lever 10, one end of which is mounted on the sensor 9 about a pivot lever axis 11 and the other end of which is articulated on a control rod 12. For its part, the control rod 12, at its end remote from the pivot lever 10, is articulated on the transverse link 3 at an articulation point 13. In this way, the sensor 9 is mechanically coupled to the transverse link 3. Pivoting movements of the transverse link 3 about its pivot axis 5 are transmitted from the control rod 12 to the pivot lever 10 and are thus detected by the sensor 9. Therefore, if the relative position of the sensor 9 with respect to the vehicle body 2 is known, the sensor 9 can be used to detect the position of the transverse link 3 (and therefore of the vehicle wheel which is coupled thereto) relative to the vehicle body. This information can be transmitted to a level-control device, for example in the form of signal values generated by the sensor 9.

Since the deviation of the pivot lever 10 on the sensor 9 forms the input signal which can be picked up by the sensor 9, on the one hand the pivot axis 5 of the transverse link 3 and the pivot lever axis 11, which preferably runs parallel to the pivot axis 5, of the sensor 9 must be at a defined distance from one another. On the other hand, given the presence of a reference position or starting relative position of the transverse link 3, a defined starting deflection or starting position for the pivot lever 10 must be observed. Since the distance between the pivot lever axis 11 and the pivot axis 5 is defined by the arrangement of the sensor 9 on the sensor holder 8 according to the invention, on the one hand, and by the common attachment of the sensor holder 8 and the transverse link 3 on the vehicle body 2, on the other hand, all that is necessary in order to achieve the required deflection of the pivot lever 10 during installation of the sensor holder 8 is to maintain a defined angle which is formed between two straight lines which intersect one another in the pivot axis 5, the first straight line running through the point 13 where the control rod 12 is articulated on the transverse link 3, and the second straight line running through the pivot lever axis 11.

Since the reference position of the transverse link 3 is defined by a determined relative position of the transverse link 3 with respect to the vehicle body 2, the abovementioned angle can be set by attaching the sensor holder 8 to the vehicle body 2 in a determined relative position in relation to the said vehicle body.

Positioning means 14 and 15 are provided in order to locate this relative position of the sensor holder 8 relative to the vehicle body 2. In the exemplary embodiment illustrated, the positioning means comprise a tongue 14, which is arranged on the sensor holder 8, and an opening 15, which is formed on the bearing bracket 4. The tongue 14 extends from the sensor holder 8, approximately parallel to the pivot axis 5, towards the bearing bracket 4. When the sensor holder 8 is fitted, the tongue 14 penetrates through the opening 15.

Since the manufacturing and assembly tolerances associated with final assembly of the wheel suspension 1 means that the reference position of the transverse link 3 may differ with regard to the vertical and horizontal arrangement of the transverse link 3 on the vehicle body 2, the positioning means (tongue 14 and opening 15) have a certain play. Since the positioning means (14 and 15) are arranged approximately vertically below the point (bearing bolt 6) where the sensor holder 8 is attached to the vehicle body 2, such play essentially need be formed only in the vertical direction. In the embodiment illustrated, this vertical play is achieved by the fact that the opening 15 is designed as a vertically running slot.

If the abovementioned manufacturing and assembly tolerances cause the relative position of the transverse link 3 with respect to the vehicle body 2 to change the horizontal direction, the change can be compensated for by a slight rotational adjustment of the sensor holder 8, during which the tongue 14 can rotate easily inside the opening 15. Accordingly, the positioning means (tongue 14 and opening 15) have a slight horizontal play.

Deviations which arise with regard to the desired relative position of the sensor holder 8 with respect to the transverse link 3 in its reference position may, for example, be compensated for by means of electronic calibration which, due to the arrangement of pivot lever 10 and control rod 12, scarcely impairs the measurement range or the measurement accuracy of the sensor 9.

Figure 3:
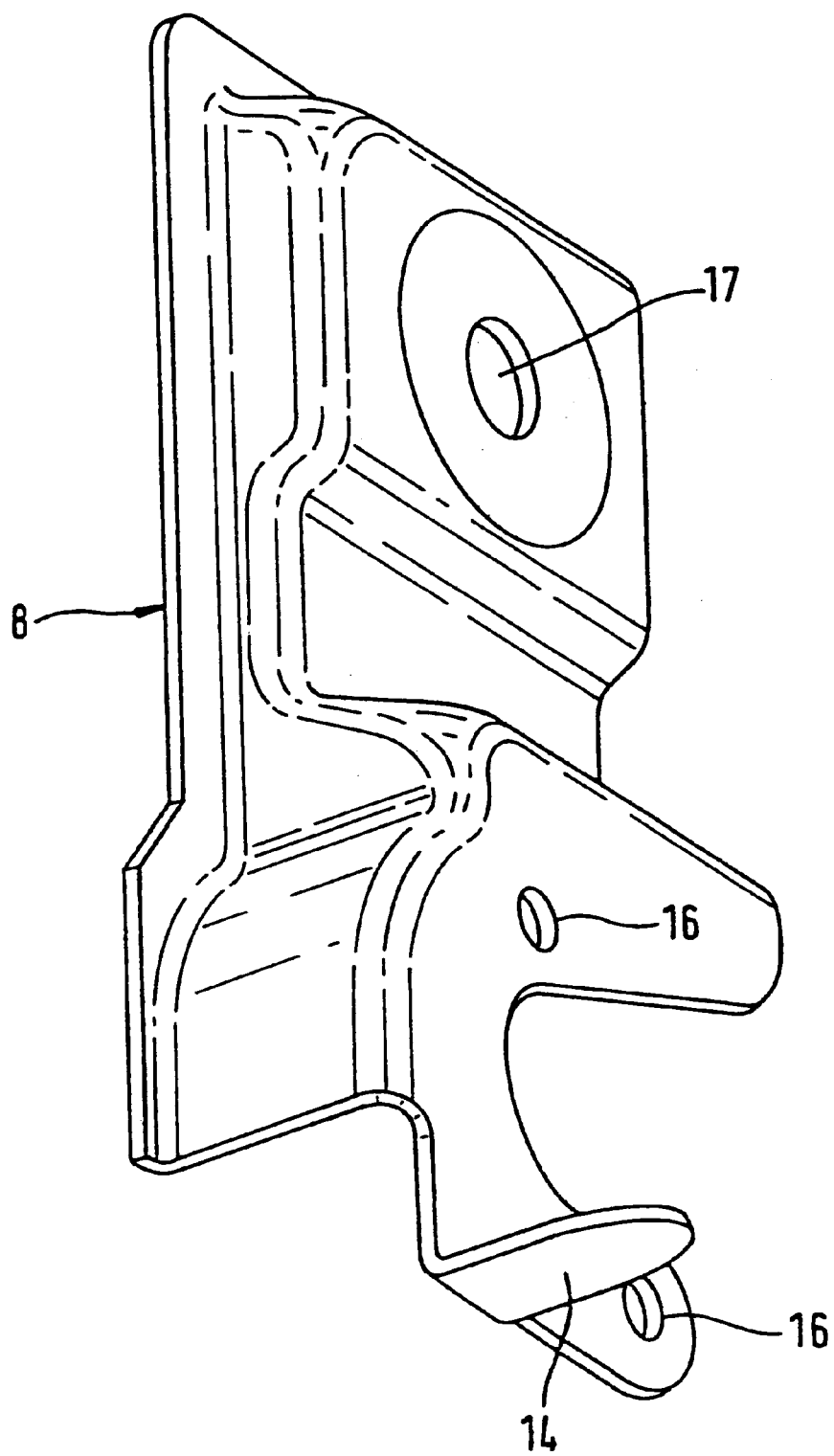
FIG. 3 shows a perspective view of a sensor holder according to the invention.

As shown in FIG. 3, the tongue 14 of the sensor holder 8 is designed so that it tapers at its free end. This measure simplifies automated fitting of the sensor holder 8, since the leading tip of the tongue 14 can easily penetrate into the opening 15 during a plug-in movement which is carried out mechanically. As this movement continues, the widening tongue 14 aligns the sensor holder 8 relative to the vehicle body 2. In the sensor holder 8, there are openings 16 which serve to position and attach the sensor 9. Moreover, the sensor holder 8 has an opening 17, by means of which the bearing bolt 6 penetrates through the sensor holder 8 in order for the sensor holder 8 to be attached to the vehicle body 2.

Since, according to the invention, there is a common point where the bearing bolt 6 for a sensor-side attachment element (sensor holder 8) and a pivot-arm-side attachment element (pivot bearing, not shown, of the transverse link 3) are attached to the vehicle body 2, it is impossible for manufacturing and assembly tolerances of all the other components of the wheel suspension 1 to have any effect on the distance between the sensor 9 and the pivot axis 5. In this respect, therefore, there is no longer any need for tolerance compensation. However, when producing the sensor holder 8, attention should be paid in particular, first, to ensuring that the relative position of the openings 16 for attachment of the sensor 9 with respect to the opening 17 for the bearing bolt 6 is designed within a relatively tight tolerance range. Secondly, the openings 16 and 17 may have centering properties, which can be achieved, for example, by a tight fit, in particular a press fit.

As an alternative to the separate sensor holder 8 illustrated in the exemplary embodiment, a housing of the sensor 9 may also be designed in a corresponding way and may, for example, contain the opening 17 for the bearing bolt 6 and be fitted with corresponding positioning means.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Sensor arrangement for a vehicle wheel suspension have a pivot arm mounted pivotably on a vehicle body, said arrangement comprising:

a sensor arranged in a fixed position on the vehicle body and adapted to be mechanically coupled to the pivot art, for detecting a relative position between the pivot arm and vehicle body; wherein a sensor-side attachment element and a pivot-arm-side attachment element are attached to the vehicle body at a common attachment point;

the sensor-side attachment element comprises a sensor mount which is fixed to the sensor; and the pivot-arm-side attachment element is a pivot bearing for pivotably attaching the pivot arm to the vehicle body.

2. Sensor arrangement according to claim 1, wherein the sensor mount is a sensor holder, which is designed as a separate component, and to which the sensor is attached.

3. Sensor arrangement according to claim 1, wherein the common attachment point of sensor-side attachment element and pivot-arm-side attachment element is formed by a bearing bolt which forms a pivot axis for the pivot arm;

the pivot-arm-side attachment element is pivotably attached to the vehicle body by the bearing bolt; and the sensor-side attachment element has a hole for the bearing bolt to fit into.

4. Sensor arrangement according to claim 3, wherein the bearing bolt is a securing screw, which attaches the sensor-side attachment element the pivot-arm-side attachment element to the vehicle body.

5. Sensor arrangement according to claim 1, further comprising positioning means for locating a predetermined relative position of the sensor-side attachment element with respect to the vehicle body.

6. Sensor arrangement according to claim 5, wherein the positioning means has a tongue situated at a distance from the pivot axis, and adapted to penetrate into an opening on the vehicle body.

7. Sensor arrangement according to claim 6, wherein the opening comprises a slot, the tongue which projects into the slot having a degree of play in an approximately radial direction in relation to the pivot axis of the pivot arm.

8. Sensor arrangement according to claim 6, wherein the tongue tapers towards its free end, while an external dimension of the tongue section which is remote from this free end corresponds to a clear internal dimension of the opening.

9. Sensor arrangement according to claim 2, wherein the tongue is formed on the sensor holder and is adapted to penetrate an opening in the vehicle body.

10. Sensor arrangement according to claim 1 wherein the pivot arm is a transverse link of the wheel suspension.

11. Sensor arrangement according to claim 1, wherein the sensor is a lifting sensor which is connected to a level-control unit of the vehicle.

* * * * *